(12) United States Patent
Gigliotti et al.

(10) Patent No.: US 8,700,991 B1
(45) Date of Patent: Apr. 15, 2014

(54) PROTECTING CONTENT PRESENTED IN A WEB BROWSER

(75) Inventors: Samuel S. Gigliotti, Seattle, WA (US);
Ryan J. Snodgrass, Kirkland, WA (US);
Charles P. Vaughn, Seattle, WA (US);
Noah L. Callaway, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 54 days.

(21) Appl. No.: 13/186,340

(22) Filed: Jul. 19, 2011

(51) Int. Cl.
*G06F 17/27* (2006.01)

(52) U.S. Cl.
USPC ............. 715/236; 715/234; 715/235; 705/51; 705/57; 726/26; 726/32; 726/33

(58) Field of Classification Search
USPC ........... 715/234–236; 705/51, 57; 726/26, 32, 726/33
See application file for complete search history.

(56) References Cited

U.S. PATENT DOCUMENTS

| | | | | |
|---|---|---|---|---|
| 6,125,186 A * | 9/2000 | Saito et al. | ..................... | 380/287 |
| 7,177,814 B2 * | 2/2007 | Gong et al. | ................. | 704/270.1 |
| 7,237,010 B2 * | 6/2007 | Mora | ............................ | 709/206 |
| 7,325,196 B1 * | 1/2008 | Covington et al. | ........... | 715/251 |
| 8,473,740 B2 * | 6/2013 | Vion-Dury | .................... | 713/167 |
| 2007/0200851 A1 * | 8/2007 | Said et al. | ...................... | 345/440 |
| 2009/0144829 A1 * | 6/2009 | Grigsby et al. | ................. | 726/26 |
| 2009/0287988 A1 * | 11/2009 | Cohen et al. | ................... | 715/204 |
| 2009/0292930 A1 * | 11/2009 | Marano et al. | ................ | 713/189 |
| 2010/0185862 A1 * | 7/2010 | Moore et al. | ..................... | 713/171 |
| 2011/0173534 A1 * | 7/2011 | Huang et al. | ................... | 715/702 |
| 2011/0246880 A1 * | 10/2011 | Horton et al. | ................. | 715/708 |
| 2012/0116896 A1 * | 5/2012 | Holloway et al. | .......... | 705/14.73 |
| 2012/0117222 A1 * | 5/2012 | Holloway et al. | ............. | 709/224 |
| 2012/0117239 A1 * | 5/2012 | Holloway et al. | ............. | 709/226 |
| 2012/0117267 A1 * | 5/2012 | Holloway et al. | ............. | 709/233 |
| 2012/0117458 A1 * | 5/2012 | Holloway et al. | ............. | 715/234 |
| 2012/0117641 A1 * | 5/2012 | Holloway et al. | ............... | 726/12 |
| 2012/0117649 A1 * | 5/2012 | Holloway et al. | ............... | 726/24 |

OTHER PUBLICATIONS

Lance Norskog; Unique Key; Feb. 3, 2009; Solr Wiki; pp. 1-2.*
Saving Ebooks with Internet Explorer; Jun. 20, 2004; ibiblio.org; pp. 1-2.*
Doctorow, Corey, "Fiendish CSS-based technique for obfuscating text," Feb. 11, 2011, 1 page, BoingBonig.net, Available: http://www.boingboing.net/2011/02/11/fiendish-css-based-t.html.
Raskin, Aza, "How to phish, protect your email, and defeat copy-and-paste with CSS," 2010, 2 pages, Raskin's blog, Available: http://www.azarask.in/blog/post/protecting-email-with-css/.

* cited by examiner

*Primary Examiner* — Andrew Dyer
(74) *Attorney, Agent, or Firm* — Lowenstein Sandler LLP (57) ABSTRACT

A method and system for protecting content presented in a web browser is provided. The method may include modifying a content item to obfuscate content, and then causing obfuscation to be dynamically removed when the content item is presented in the web browser.

23 Claims, 9 Drawing Sheets

PROTECTING CONTENT PRESENTED IN A WEB BROWSER

BACKGROUND

A large and growing population of users is enjoying entertainment through the consumption of digital content items, such as electronic books or "eBooks." The users employ various electronic devices to read eBooks. Among these electronic devices are electronic book readers, cellular telephones, personal digital assistants (PDAs), portable media players, tablet computers, netbooks, personal computers, and the like. A user can obtain access to an eBook by downloading it from a content provider or by accessing a content provider website via a web browser. However, modern web browsers allow users to save the displayed content to a disk using the "Save As" option in the web browser's toolbar, which can lead to unauthorized distribution of eBooks.

DETAILED DESCRIPTION

Methods and systems for protecting content presented in a web browser on a user device are described. A user device may be any computing device that can connect to a network. Examples of such user devices include electronic book readers, cellular telephones, personal digital assistants (PDAs), portable media players, tablet computers, netbooks, and the like. A user device may connect to a network to obtain content items from an item providing system or to perform other activities. Content items may include electronic books (e-books), newspaper articles, journal articles, magazine articles, news feeds and blog feeds, or any other documents that contain textual content.

In one embodiment, the item providing system modifies content items to obfuscate content and stores the modified content items. A content item may be obfuscated by adding random words at random locations within the content item, repositioning words within the content item, or performing any other modifications to create an obfuscated version of the content item. When a user requests a specific content item via a web browser, the web browser sends a request for the requested content item to the item providing system. In response, the item providing system sends a modified version of the requested content item to the web browser, along with a script that causes obfuscation to be dynamically removed from the modified content item at the user device when the content item is presented in the web browser on the user device.

In another embodiment, the item providing system creates a script that is intended to obfuscate the content at the client before the content is presented in the web browser and to cause the obfuscation to be removed from the modified content when the content is presented in the web browser. When the item providing system receives a browser request for a content item, the item providing system sends the requested content item to the web browser, along with a script that performs obfuscation at the client and causes the obfuscation to be dynamically removed from the modified content item when it is presented in the web browser. In yet another embodiment, the item providing system performs some obfuscation of a content item, and then when the content item is requested by a web browser, the content item is provided to the web browser with a script that performs additional obfuscation of the content item and then causes all the obfuscation to be removed from the content item when the content item is presented in the web browser.

In each of the above-mentioned embodiments, the user can view the unobfuscated content in the web browser but the user cannot save the unobfuscated content when viewing it in the web browser. In particular, when the user tries to save the displayed content (e.g., via the "Save As" option in the browser toolbar), the web browser saves the modified version of the requested content item that was provided by the item providing system.

Accordingly, an efficient mechanism is provided that prevents users from saving unobfuscated content displayed in a web browser to a persistent storage medium, thus preventing unauthorized use and distribution of the original content.

Figure 1:
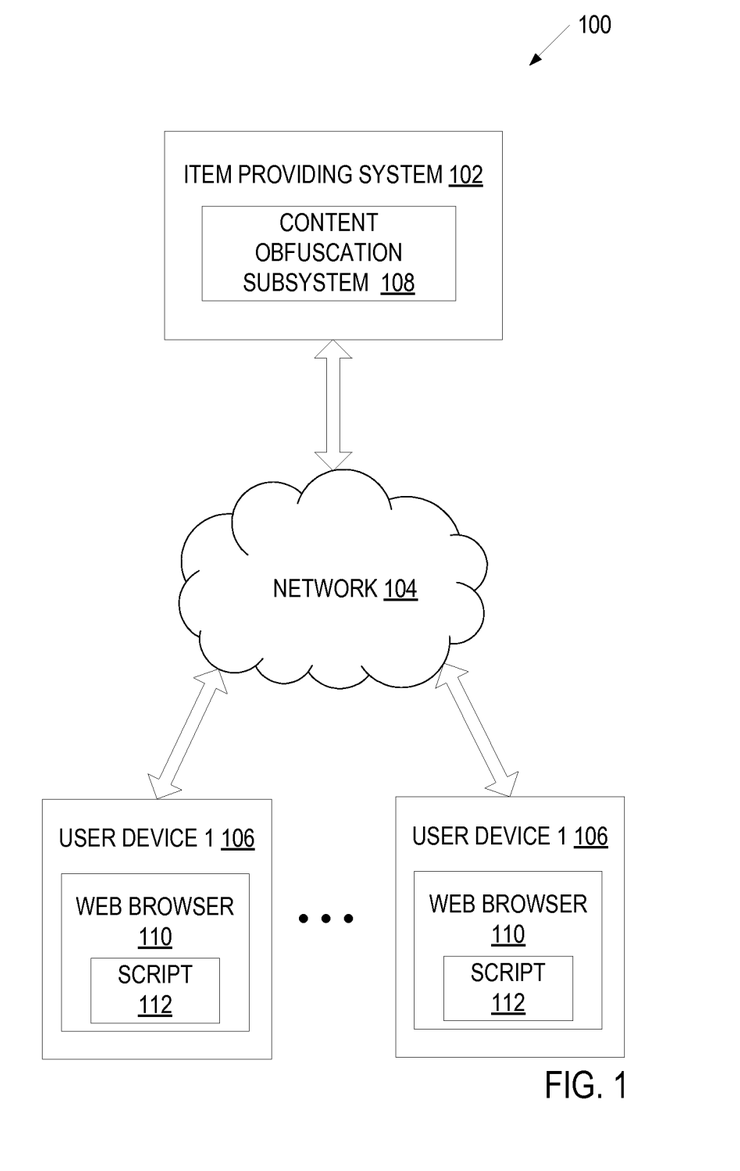
FIG. 1 is a block diagram of an exemplary network architecture in which embodiments of the invention may operate.

FIG. 1 is a block diagram of exemplary network architecture 100 in which embodiments of the invention may operate. The network architecture 100 may include an item providing system 102 and multiple user devices 106 coupled to the item providing system 102 via a network 104 (e.g., a public network such as the Internet, a private network such as a local area network (LAN), or a virtual private network (VPN)).

The user devices 106 are variously configured with different functionality to enable consumption of content items. As discussed above, the content items may include e-books, newspaper articles, journal articles, magazine articles, news feeds, and blog feeds, and other documents that contain textual content. The user devices 106 may include any type of content rendering devices such as electronic book readers, portable digital assistants, mobile phones, laptop computers, portable media players, tablet computers, cameras, video cameras, netbooks, notebooks, personal computers, desktop computers, gaming consoles, DVD players, media centers, or any other computing device. Each user device 106 may host a web browser 110 that allows a user to access and view various content items provided via the network 104. Web browser 110 may be Internet Explorer®, Firefox®, Chrome®, Safari®, or any other browser allowing a user to save the displayed content to a persistent storage medium (e.g., via the "Save As" option on the browser toolbar). The above web browsers allow a content item to be dynamically modified when it is being rendered. However, the web browsers are unable to store the dynamically changed state of the content. Hence, if a user attempts to save the content displayed in the web browser, the web browser 110 saves the content version that existed prior to the dynamic modification and not the dynamically modified content displayed in the web browser.

The item providing system 102 provides items, upgrades, and/or other information to the user devices 106 registered with the item providing system 102 via the network 104. The item providing system 102 also receives various requests, instructions and other data from the user devices 106 via the network 104. The item providing system 102 may include one or more machines (e.g., one or more server computer systems, routers, gateways) that have processing and storage capabilities to provide the above functionality.

Communication between the item providing system 102 and a user device 106 may be enabled via any communication infrastructure. One example of such an infrastructure includes a combination of a wide area network (WAN) or a VPN and wireless infrastructure, which allows a user to use the user device 106 to purchase items and consume items without being tethered to the item providing system 102 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 106. Yet alternatively, or in combination, the wireless infrastructure may be provided by an access point (e.g., Wi-Fi® access point) provider system.

The communication infrastructure may also include a communication-enabling system that serves as an intermediary in passing information between the item providing system 102 and the wireless carrier. The communication-enabling system may communicate with the wireless carrier via a dedicated channel, and may communicate with the item providing system 102 via a non-dedicated communication mechanism, e.g., a public network such as the Internet.

Users of the user devices 106 can register with the item providing system 102 to receive various content items that may include, for example, e-books, articles and other documents. In one embodiment, the item providing system 102 includes a content obfuscation subsystem 108 that modifies content items using an obfuscation algorithm to create obfuscated versions of the original content items. The obfuscation algorithm may modify content items by, for example, adding random text at random locations within the content items, by repositioning words within the content items, or by using any other obfuscation techniques. In addition, the content obfuscation subsystem 108 may create a script (e.g., JavaScript®) intended to undo content modifications produced by the obfuscation algorithm. The content obfuscation subsystem 108 may associate the script with each content item modified using the obfuscation algorithm and store this association in a data store.

When web browser 110 sends a request for a specific content item to the item providing system 102, the content obfuscation subsystem 108 provides a modified version of the requested content item to the web browser 110, along with the associated script. When the web browser 110 renders the modified version, the script (shown as script 112) executes in the web browser 110 to cause obfuscation to be dynamically removed from the modified content item, resulting in the display of the unobfuscated content. In one embodiment, the script 112 dynamically updates a style sheet associated with the content item by adding cascading style sheet (CSS) rules that remove obfuscation from the modified version when the content is rendered in the web browser.

In another embodiment, the content obfuscation subsystem 108 creates a script that is intended to obfuscate the content at the user device 106 before the content is presented in the web browser 110 and to cause the obfuscation to be removed from the modified content when the content is presented in the web browser 110. When the item providing system 102 receives a browser request for a content item, the content obfuscation subsystem 108 sends the requested content item to the web browser 110, along with the script 112, which when executed in the web browser 110, performs obfuscation of the content item stored in memory of the user device 106 and then causes the obfuscation to be dynamically removed from the modified content item when it is presented in the web browser 110. In yet another embodiment, the content obfuscation subsystem 108 performs some obfuscation of a content item, and then when the content item is requested by the web browser 110, the content item is provided to the web browser 110 with the script 112 that performs additional obfuscation of the content item stored in memory of the user device 108 and then causes all the obfuscation to be dynamically removed from the content item when the content item is presented in the web browser 110.

As discussed above, web browsers do not store the dynamically modified content state. Hence, if the user attempts to save the displayed content, the web browser 110 uses the static version of the displayed content (i.e., the modified content item received from the item providing system 102 or the content item modified by the script 112) when creating a copy and saving it to a storage device specified by the user. Due to obfuscation, the saved content is hard to understand and has no practical usage.

Figure 2:
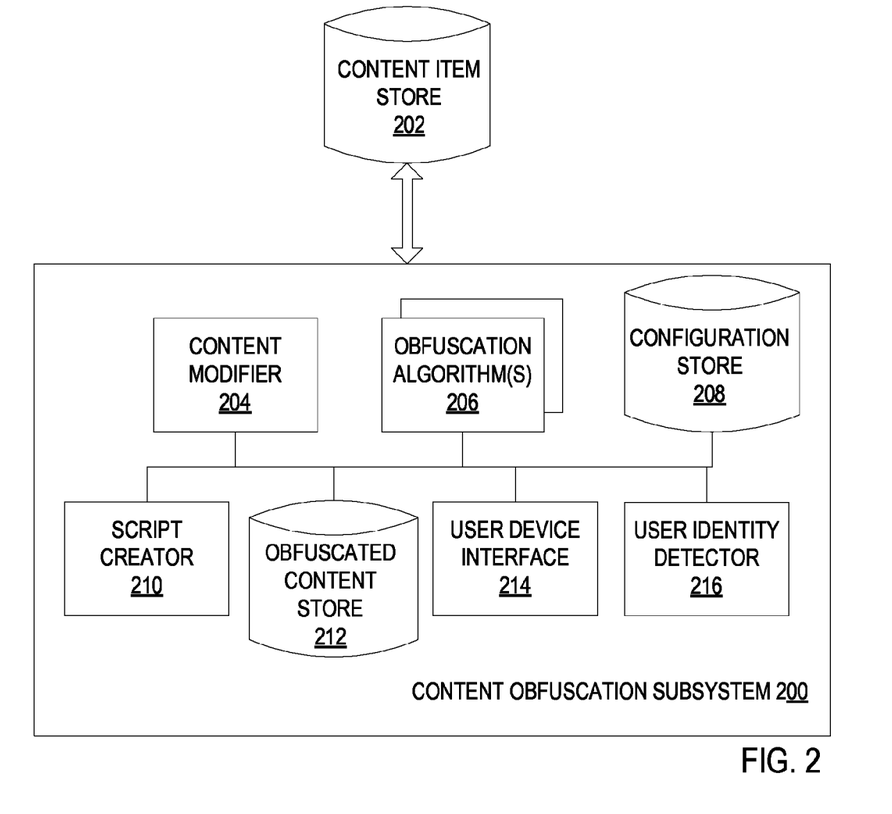
FIG. 2 is a block diagram of one embodiment of a content obfuscation subsystem.

FIG. 2 is a block diagram of one embodiment of a content obfuscation subsystem 200. The content obfuscation subsystem 200 may be the same as the content obfuscation subsystem 108 of FIG. 1. In one embodiment, the content obfuscation subsystem 200 includes a content modifier 204, one or more obfuscation algorithms 206, a script creator 210, a user device interface 214, a user identity detector 216, a content item store 202, a configuration store 208, and an obfuscated content store 212. The components of the content obfuscation subsystem 200 may represent modules that can be combined together or separated into further modules, according to some embodiments. Any of the content item store 202, configuration store 208, and obfuscated content store 212 may be local or remote and may represent a single data structure or multiple data structures (databases, repositories, files, etc.) residing on one or more mass storage devices, such as magnetic or optical storage based disks, solid-state drives (SSDs) or hard drives.

The content modifier 204 modifies content items stored in the content item store 202 to create obfuscated versions of these content items. The content item store 202 may include content items such as e-books, newspaper articles, journal articles, magazine articles, news feeds and blog feeds provided by various publishers and/or authors. The content items stored in the content item store 202 may be documents or web pages (e.g., HTML documents) having any format understandable by web browsers. Such documents may be associated with style sheets (e.g., cascading style sheets (CSS)) that define content presentation characteristics. The style sheets may be provided by content publishers and authors or may be created by the item providing system 102. The content modifier 204 may modify all content items in the content item store 202 or only content items having specific characteristics (e.g., specific content item types, copyrighted content items, content items identified as requiring additional protection, and the like). The content modifier 204 may store the modified content items in the obfuscated content store 212. In one embodiment, the content modifier 204 links each modified content item to a style sheet, which may be a separate file or part of the same document.

As discussed, in one embodiment, the content modifier 204 obfuscates content items in advance and stores the obfuscated content items in the obfuscated content store 212. In another embodiment, the content modifier 204 obfuscates a content item upon receiving a request for the content item from a user device.

The content modifier 204 may use one or more obfuscation algorithms 206 to modify the content items from the content item store 202. One exemplary obfuscation algorithm may insert random text from one or more external sources (e.g., online dictionaries or other content repositories) at random locations within a content item. Another exemplary obfuscation algorithm may insert random text from a content item at random locations within the content item. Yet another exemplary obfuscation algorithm may reposition words within a content item.

Configuration algorithms 206 may be configured using configuration data in the configuration store 208. For example, the configuration data may specify an external source to be used for obfuscation, the size of each inserted portion, the obfuscation percentage and the like. The configuration data may vary depending on different content characteristics. For example, the obfuscation percentage may be higher for e-books and lower for scientific magazines. In addition, the configuration data may be different for various browsers (e.g., the obfuscation percentage may vary depending on the rendering capabilities of different web browsers). When the configuration data varies depending on a web browser, the content modifier 204 may create different obfuscated versions for different browsers and store them in the content item store 202. Alternatively, the content modifier 204 may create an obfuscated version on the fly upon receiving a request for a content item from a specific web browser. Further, the configuration data may vary depending on an entity associated with a content item, such as a publisher or an author. In one embodiment, the configuration is changed randomly in order to make reverse engineering of content obfuscation performed by the content modifier 204 more difficult.

In one embodiment, the content modifier 204 selects a certain obfuscation algorithm 206 based on predefined parameters stored in the configuration store 208. For example, the predefined parameters may be content item characteristics (e.g., content type, content item size and the like), web browser characteristics, or preferences of an entity associated with a content item (e.g., a content item publisher or author). In one embodiment, the content modifier selects obfuscation algorithms 206 randomly to make reverse engineering more difficult.

In one embodiment, the content modifier 204 adds to an obfuscation portion of the content item a variable parameter for capturing user identifying information known to a web browser. The user identifying information may be a user name, a user login ID or the like. In one embodiment, the variable parameter may require that the user identifier provided by the web browser be hidden (e.g., by transforming it into a corresponding set of characters and then adding this set of characters as the value of the variable parameter). As will be discussed in more detail below, the user identifying information may later be used by the user identity detector 216 to determine which user has distributed the obfuscated content.

The script creator 210 creates scripts (e.g., Javascripts) intended to undo content modifications produced by individual obfuscation algorithms, associates each content item modified using a specific obfuscation algorithm 206 with a script corresponding to this obfuscation algorithm 206, and stores these associations in the obfuscated content store 212. In one embodiment, the script creator 210 creates a script that dynamically updates a style sheet associated with a content item by adding CSS rules that remove obfuscation from the modified version of the content item when the content item is rendered in the web browser. For example, the CSS rules may require that the random text inserted into the modified content item as part of obfuscation be invisible when this content item is displayed in the web browser. In another example, the CSS rules may require that repositioning of text portions in the modified content item be undone when this content item is displayed in the web browser.

The user device interface 214 facilitates communication with user devices. In particular, when a web browser hosted by a user device sends a request for a specific content item to the item providing system 102, the user device interface 214 provides a modified version of the requested content item and the associated script to the web browser. When the web browser renders the modified version, the script dynamically updates the style sheet of the modified content item to add corresponding CSS rules that remove obfuscation from the modified version.

In another embodiment, the content modifier 204 does not perform obfuscation of the content item or performs only partial obfuscation of the content item. Instead, the entire obfuscation or partial obfuscation is performed at the user device. In this other embodiment, the script creator 10 creates a script that is intended to obfuscate the content item at the user device before the content is presented in the web browser and to cause the obfuscation to be removed from the modified content item when the content item is presented in the web browser. Original or partially modified content items are associated with respective scripts and these associations are stored in the obfuscated content store 212. When the user device interface 214 receives a browser request for a content item, it sends the requested content item to the web browser, along with a corresponding script. At the web browser, the script performs obfuscation or additional obfuscation of the content item, and stores the content item with a corresponding style sheet (created by the script or provided to the user device by the content obfuscation subsystem 200) in memory of the user device. The script then dynamically updates the style sheet stored in memory of the user device to add CSS rules that remove the obfuscation when the content item is presented in the web browser.

As discussed above, web browsers do not store the dynamically modified content state. Hence, if the user attempts to save the displayed content, the web browser uses the obfuscated content item when creating a copy and saving it to a specified storage device as a web page archive file (e.g., .mht or .mhtml file).

Once the user creates a web page archive file, the user may share it with others, thus facilitating unauthorized distribution of content. A publisher or an author of the content or an entity associated with the item providing system 102 may become aware of this unauthorized distribution and may send the distributed content item to the content obfuscation subsystem 200. In this case, the user identity detector 216 may analyze the distributed content item to determine whether it includes user identifying information. If so, the user identity detector 216 may extract the user identifying information and use it to determine the identity of the user. This may be especially useful if the user was able to remove obfuscation from content before saving the content and sharing it with others.

FIGS. 3A, 3B, 4, 5 and 6 are flow diagrams of various embodiments of server-side methods. The methods are performed by processing logic that may comprise hardware (circuitry, dedicated logic, etc.), software (such as is run on a general purpose computer system or a dedicated machine), or a combination of both. In one embodiment, the methods are performed by the item providing system 102 of FIG. 1.

Figure 3A:
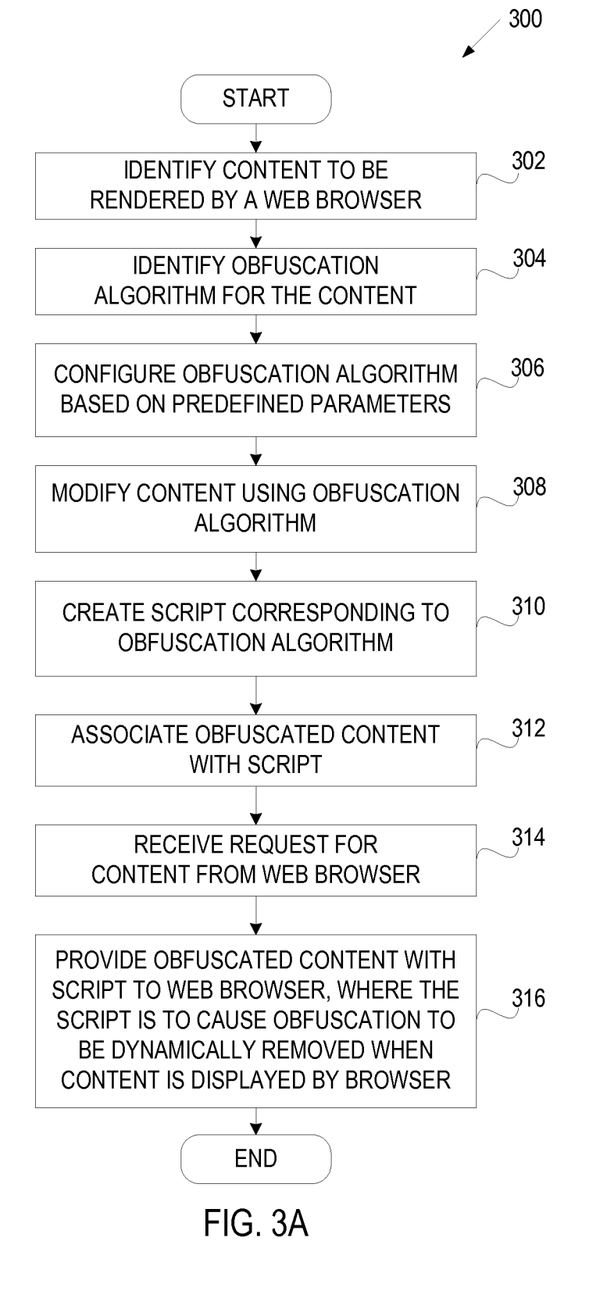
FIG. 3A is a flow diagram of one embodiment of a method for protecting content presented in a web browser.

FIG. 3A is a flow diagram of one embodiment of a method 300 for protecting content presented in a web browser. Method 300 may begin with the item providing system identifying a content item to be rendered by a web browser (block 302). The content item may be provided by a publisher or an author or created by the item providing system. The content item may be an HTML document or any other document that can be accessed via a web browser.

At block 304, the item providing system identifies an obfuscation algorithm for the content item. The item providing system may select an obfuscation algorithm based on characteristics of the content item (e.g., content item type, content item size), characteristics of a web browser that will present the content item (e.g., browser rendering capability), or a preference of an entity associated with the content item (e.g., a publisher or an author). At block 306, the item providing system configures the obfuscation algorithm based on configuration data (e.g., obfuscation percentage, maximum size of a resulting content item, source of random text to be added for obfuscation). In one embodiment, the selection of an obfuscation algorithm and/or the configuration of the obfuscation algorithm is changed randomly to make reverse engineering more difficult.

At block 308, the item providing system modifies the content item using the obfuscation algorithm. At block 310, the item providing system creates a script corresponding to the obfuscation algorithm. At block 312, the item providing system associates the obfuscated content with the script and stores the association in a data store. Exemplary embodiments of content obfuscation methods will be discussed in more detail below in conjunction with FIGS. 4 and 5.

At block 314, the item providing system receives a request for a content item from a web browser. At block 316, the item providing system identifies a modified version of the content item and provides the modified version and the associated script to the web browser. In one embodiment, the item providing system also provides a style sheet of the content item.

In another embodiment, the item providing system does not obfuscate a content item until receiving a web browser request for this content item. In particular, the item providing system may perform blocks 302, 304, 306 and 310, and then associate the content item with the script at block 312. In response to receiving a request for the content item at block 314, the item providing system may perform block 308, and then provide the resulting obfuscated content with a corresponding script to the web browser at block 316.

When the web browser renders the modified content item, the script is dynamically executed to cause the obfuscation to be removed from the modified content item. In one embodiment, the script dynamically updates the style sheet of the content item to add CSS rules that undo the obfuscation.

Figure 3B:
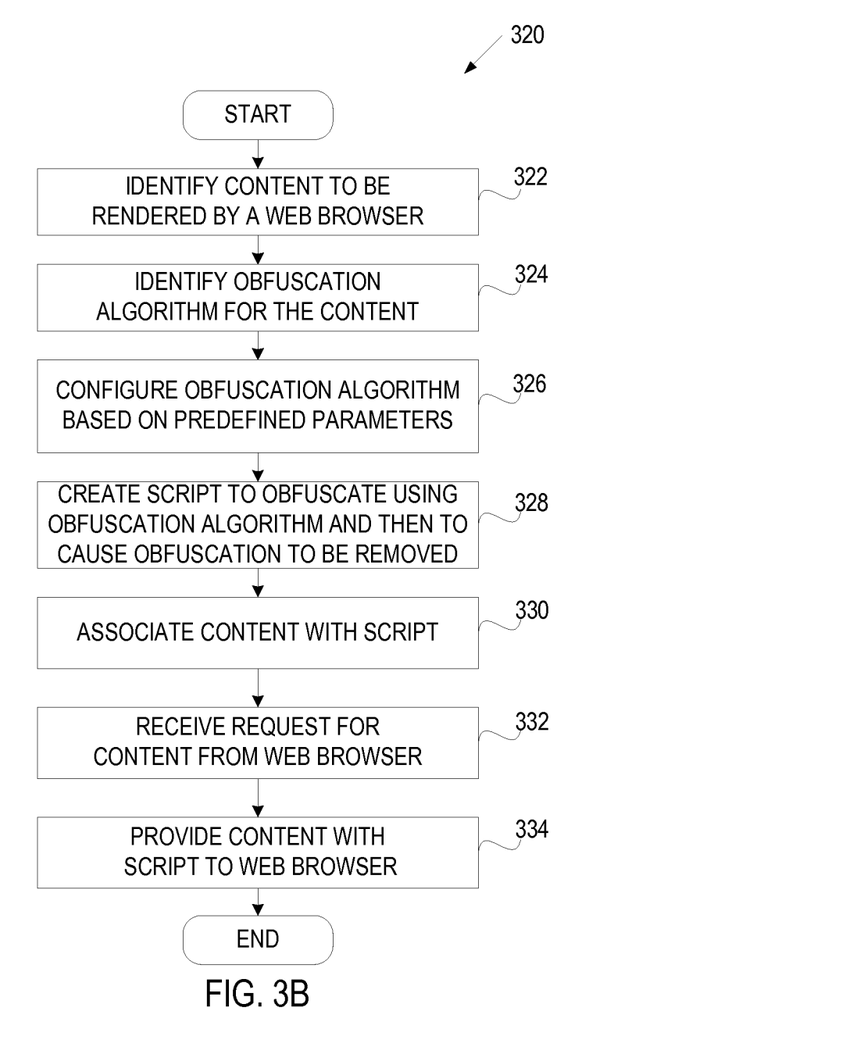
FIG. 3B is a flow diagram of another embodiment of a method for protecting content presented in a web browser.

FIG. 3B is a flow diagram of another embodiment of a method for protecting content presented in a web browser. Method 320 may begin with the item providing system identifying a content item to be rendered by a web browser (block 322), identifying an obfuscation algorithm for the content item (block 324), and configuring the obfuscation algorithm based on configuration data (block 326).

At block 328, the item providing system creates a script corresponding to the obfuscation algorithm. The script is intended to perform obfuscation of the content item and then to cause the obfuscation to be dynamically removed when the content item is presented in the web browser. At block 330, the item providing system associates the content item with the script and stores the association in a data store. At block 332, the item providing system receives a request for a content item from a web browser. At block 316, the item providing system provides the content item and the associated script to the web browser. In one embodiment, the item providing system also provides a style sheet of the content item.

When the web browser receives the content item and the script (and optionally the style sheet), the script obfuscates the content item, creates or updates the style sheet and stores the content item and the style sheet in memory of the user device. The script then dynamically updates the style sheet of the content item to add CSS rules that undo the obfuscation.

Figure 3C:
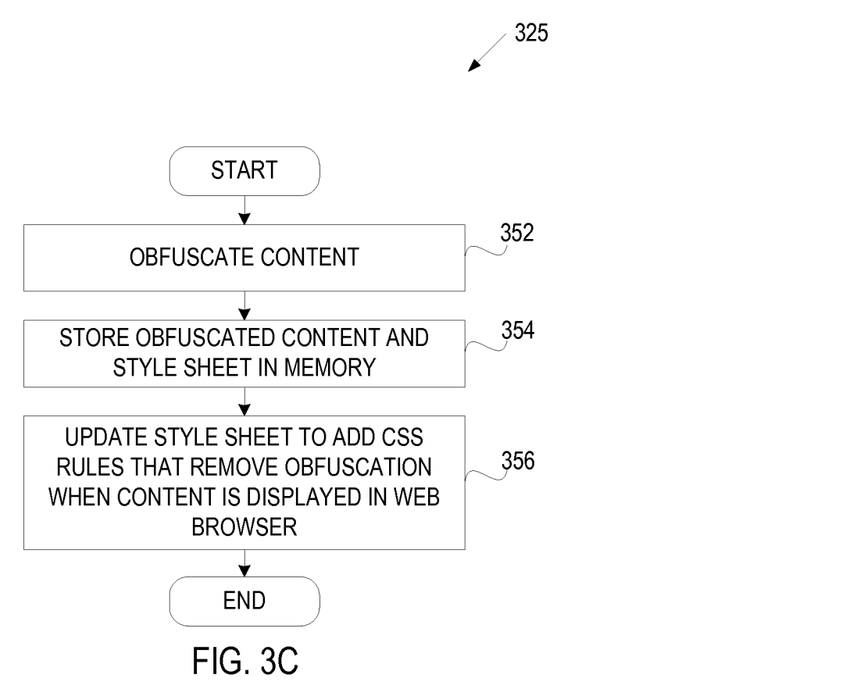
FIG. 3C is a flow diagram of one embodiment of a method performed by a script executed in a web browser.

FIG. 3C is a flow diagram of one embodiment of a method 350 performed by a script that is executed in a web browser. At block 352, the script obfuscates a content item and creates a style sheet for the content item. Alternatively, the script updates an existing style sheet provided by the item providing system with the content item. At block 354, the script stores the content item and style sheet in memory of the user device. At block 356, the script dynamically updates the style sheet to add CSS rules that remove obfuscation when the content is displayed in the web browser.

Figure 4:
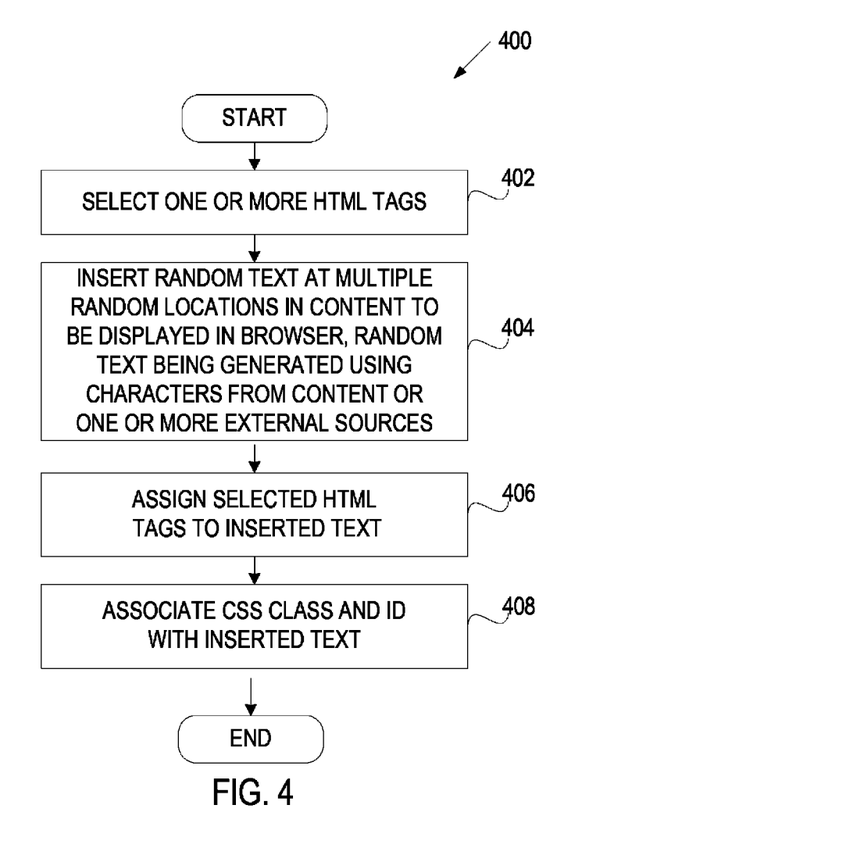
FIG. 4 is a flow diagram of one embodiment of a method for obfuscating content using random text.

FIG. 4 is a flow diagram of one embodiment of a method 400 for obfuscating a content item using random text. Method 400 may be performed by the item providing system or a JavaScript executing on the user device. Method 400 may begin with selecting one or more tags (e.g., HTML tags) to be used for obfuscation. The tags may include a paragraph tag, a bold tag, an italic tag, and so on (block 402). At block 404, random text is inserted at multiple random locations within the content item. The random text may include characters selected from different places in the content item or characters selected from various external sources (e.g., online dictionaries, content provider websites, or any other content repository).

At block 406, one of the selected tags is assigned to one or more inserted text portions. At block 408, a CSS class (e.g., span class) and a CSS class ID are associated with each inserted text portion.

For example, a paragraph tag <p> may be assigned to the content portion "this is a test" and the resulting text may be converted into the following fragment:
<p>th<span class="RANDOM_ID_1"><b>RANDOM_TEXT</b></span>is a <span class="RANDOM_ID_2"><i>MORE_RANDOM_TEXT</i></span>test </p>

When the style sheet is updated to add CSS rules that prevent display of inserted text, the added CSS rules for the above example may include ".RANDOM_ID_1 {display:none}" and ".RANDOM_ID_2 {display:none}."

In the above example, if a user attempts to save the displayed content item, the saved file will include the following text:
"thRANDOM_TEXTis is aMORE_RANDOM_TEXT test."

Figure 5:
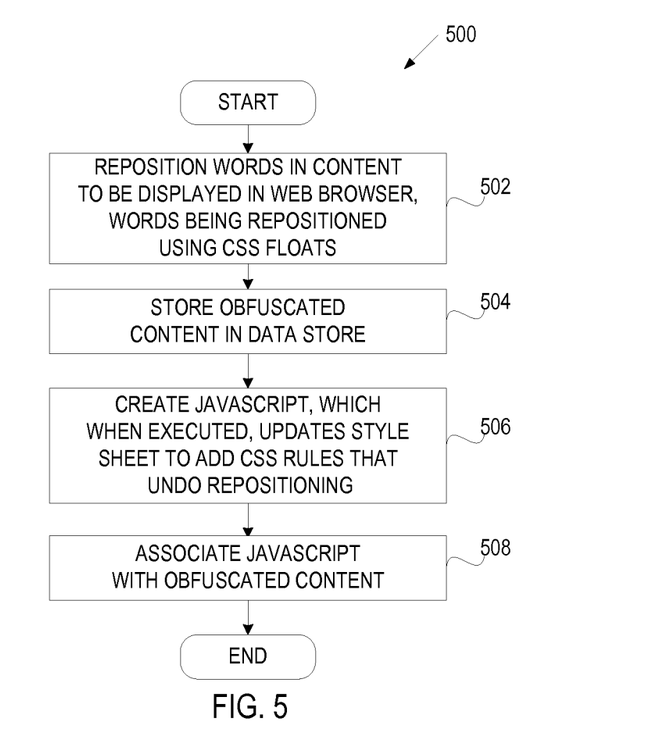
FIG. 5 is a flow diagram of one embodiment of a method for obfuscating content using text repositioning.

FIG. 5 is a flow diagram of one embodiment of a method 500 for obfuscating content using text repositioning. Method 500 may begin with the item providing system repositioning words in a content item (block 502). In one embodiment, words may be repositioned using CSS positioning.

At block 504, the item providing system stores the obfuscated content item in a data store. At block 506, the item providing system creates a JavaScript, which when executed, updates the style sheet to add CSS rules that undo repositioning. At block 508, the item providing system associates the JavaScript with the obfuscated content.

In another embodiment, the repositioning is performed by the JavaScript to obfuscate the content when the JavaScript is executed in the web browser. The JavaScript then dynamically updates a corresponding style sheet to add CSS rules to undo the repositioning.

Figure 6:
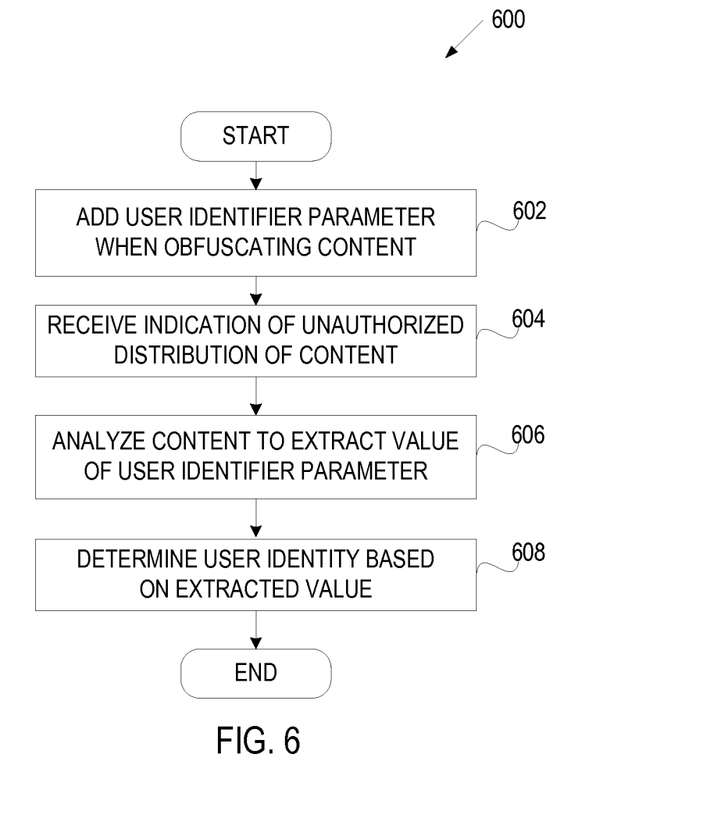
FIG. 6 is a flow diagram of one embodiment of a method for determining the identity of a user involved in unauthorized distribution of content.

FIG. 6 is a flow diagram of one embodiment of a method 600 for determining the identity of a user involved in unauthorized distribution of content. Method 600 may begin when the item providing system modifies a content item to obfuscate it and adds a variable parameter for capturing user identifying information (block 602).

Subsequently, at block 604, the item providing system receives an indication of unauthorized distribution of a content item. For example, the item providing system may detect that a content item is distributed to or from an authorized user. In another example, the item providing system may receive a content item from a publisher or author with a message indicating unauthorized distribution of the content item.

In response, the item providing system analyzes the content item to extract the value of the user identifier parameter (block 606). At block 608, the item providing system determines the user identity based on the extracted value (block 608).

Figure 7:
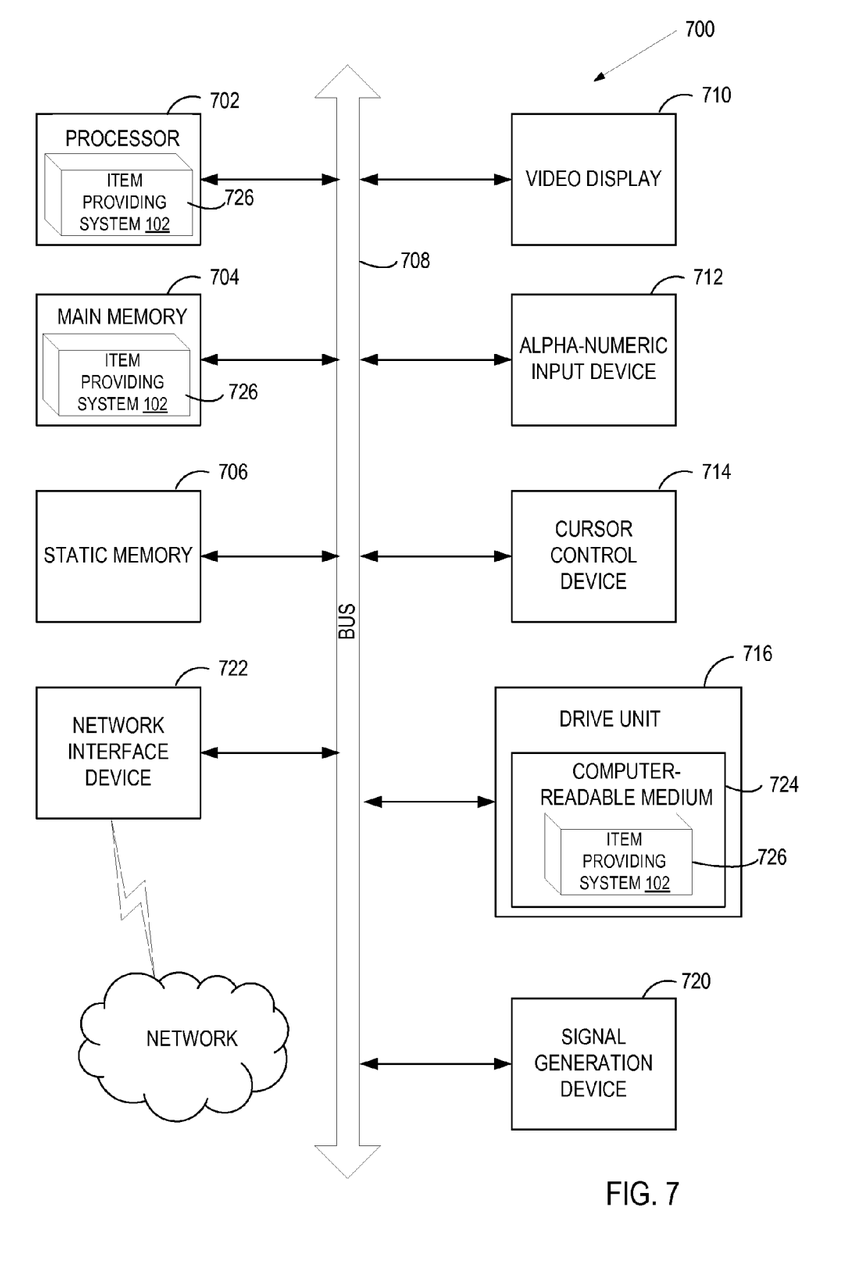
FIG. 7 illustrates an exemplary item providing system.

FIG. 7 illustrates an exemplary item providing system 700 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 706.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the server text illustration subsystem 108 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

A drive unit 716 may include a computer-readable medium 724 on which is stored one or more sets of instructions (e.g., instructions of server text illustration subsystem 108) embodying any one or more of the methodologies or functions described herein. The instructions of the server text illustration subsystem 108 may also reside, completely or at least partially, within the main memory 704 and/or within the processor 702 during execution thereof by the computer system 700, the main memory 704 and the processor 702 also constituting computer-readable media. The instructions of the server text illustration subsystem 108 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computer system, comprising:
   identifying an original content item to be rendered, using an associated style sheet, by a web browser;
   modifying the original content item by the computer system without user input using an obfuscation algorithm to create an obfuscated version of the original content item, wherein the obfuscation algorithm obfuscates the original content item based on at least one of inserting a plurality of new text portions at a plurality of locations in the original content item or repositioning one or more existing text portions within the original content item;
   associating the modified content item with a script operable to undo content modifications produced by the obfuscation algorithm;
   receiving a request for the original content item from the web browser; and
   in response to the request for the original content item, providing the modified content item and the script to the web browser, wherein the script dynamically updates the associated style sheet by adding one or more style sheet rules that remove obfuscation from the modified content item when the modified content item is rendered in the web browser, and wherein the obfuscated version of the original content item, rather than the original content item, is saved to a persistent storage when a user requests that the displayed content item in the web browser be saved to the persistent storage.

2. The method of claim 1 wherein the script is a client-side script.

3. The method of claim 1, wherein the original content item contains HTML tags and wherein modifying the original content item using the obfuscation algorithm further comprises:
   selecting one or more of the HTML tags;
   assigning the selected HTML tags to the plurality of new text portions; and
   associating a cascading style sheet (CSS) class and an identifier with each new text portion.

4. The method of claim 3 further comprising:
   creating the script, which when executed at a client, updates the style sheet stored in memory of the client to add the one or more style sheet rules that prevent display of the inserted new text portions.

5. The method of claim 3 further comprising:
   creating the plurality of new text portions using characters from one or more of the original content item and at least one external source.

6. The method of claim 1 further comprising:
   adding a user identifier parameter when modifying the original content item.

7. The method of claim 6 further comprising:
   receiving an indication of an unauthorized distribution of the modified content item; and
   analyzing the modified content item to extract a value of the user identifier parameter.

8. The method of claim 1 wherein modifying the original content item using the obfuscation algorithm comprises the repositioning of the one or more existing text portions of the original content item.

9. The method of claim 8 further comprising:
   creating the script, which when executed at a client, updates the style sheet stored in memory of the client to add one or more CSS rules that undo the repositioning of the one or more existing text portions.

10. The method of claim 1 further comprising:
    selecting the obfuscation algorithm from a plurality of obfuscation algorithms randomly or based on one or more parameters; and
    configuring the obfuscation algorithm based on configuration data, wherein a configuration of the obfuscation algorithm is changed randomly prior to performing obfuscation of the original content item.

11. The method of claim 10 wherein the one or more parameters comprise at least one of a characteristic of the original content item, a characteristic of the web browser, and an entity preference, the entity comprising at least one of an original content item publisher, an original content item author, and an end user.

12. A server computing system comprising:
    a memory to store a plurality of content items; and
    a processing device, coupled to the memory, to:
       identify a content item of the plurality of content items to be rendered, using an associated style sheet, by a web browser;
       modify the plurality of the identified content item without user input using a content obfuscation algorithm, wherein the content obfuscation algorithm obfuscates the content item based on at least one of inserting a plurality of new text portions at a plurality of locations in the content item or repositioning one or more existing text portions within the content item;
       associate the content item with a script operable to undo content modifications produced by the obfuscation algorithm;
       receive a request for the content item from the web browser; and
       provide a modified version of the requested content item and the script to the web browser, wherein the script dynamically updates the associated style sheet by adding one or more style sheet rules that remove obfuscation from the requested content item when the requested content item is presented in the web browser, and wherein the modified version, rather than an original version of the requested content item, is saved to a persistent storage when a user requests that the requested content item presented in the web browser be saved to the persistent storage.

13. The system of claim 12 wherein the processing device is configured to modify one or more of the plurality of content items using a plurality of obfuscation algorithms.

14. The system of claim 13 wherein the processing device is further configured to create a script corresponding to each obfuscation algorithm to cause content modifications produced by the obfuscation algorithm to be removed from respective content items.

15. The system of claim 12 wherein the plurality of content items contain HTML tags and wherein the processing device is configured to modify or more of the plurality of the identified content item by:
   selecting one or more HTML tags;
   assigning the selected HTML tags to the plurality of new text portions;
   associating a cascading style sheet (CSS) class and an identifier to each new text portion; and
   creating a script, which when executed, updates a style sheet associated with the content item to add the one or more style sheet rules that prevent display of inserted new text portions.

16. The system of claim 15 wherein the plurality of new text portions includes characters from one or more of the content item and at least one external source.

17. The system of claim 15 wherein the processing device is configured to modify the content item by:
   the repositioning of the one or more existing text portions of the content item; and
   creating a script, which when executed, updates a style sheet associated with the content item to add the one or more style sheet rules that undo the repositioning of the one or more existing text portions.

18. A non-transitory computer readable storage medium including instructions that, when executed by a processing device, cause the processing device to perform operations comprising:
   identifying an original content item to be rendered, using an associated style sheet, by a web browser;
   modifying the original content item by the processing device without user input using an obfuscation algorithm to create an obfuscated version of the original content item, wherein the obfuscation algorithm obfuscates the original content item based on at least one of inserting a plurality of new text portions at a plurality of locations in the original content item or repositioning one or more existing text portions within the original content item;
   associating the modified content item with a script operable to undo content modifications produced by the obfuscation algorithm;
   receiving a request for the original content item from the web browser; and
   in response to the request for the original content item, providing the modified content item and the script to the web browser, wherein the script dynamically updates the associated style sheet by adding one or more style sheet rules that remove obfuscation from the modified content item when the modified content item is rendered in the web browser, and wherein the obfuscated version of the original content item, rather than the original content item, is saved to a persistent storage when a user requests that the displayed content item in the web browser be saved to the persistent storage.

19. The computer readable medium of claim 18, wherein the original content item contains HTML tags and wherein modifying the original content item comprises:
   selecting one or more of the HTML tags;
   assigning the selected HTML tags to the plurality of new text portions; and
   associating a cascading style sheet (CSS) class and an identifier with each new text portion.

20. The computer readable medium of claim 18 wherein the operations further comprise:
   creating the script, which when executed, updates the style sheet to add the one or more style sheet rules that prevent display of the inserted new text portions.

21. The computer readable medium of claim 18 wherein adding obfuscation to the original content item further comprises:
   creating the plurality of new text portions using characters from one or more of the original content item and at least one external source.

22. The computer readable medium of claim 18 wherein adding obfuscation to the original content item comprises the repositioning of the one or more existing text portions of the original content.

23. The computer readable medium of claim 22 wherein the operations further comprise:
   creating the script, which when executed, updates the style sheet to add the one or more style sheet rules that undo the repositioning of the one or more existing text portions.

* * * * *